United States Patent [19]

Persem et al.

[11] Patent Number: 4,633,672

[45] Date of Patent: Jan. 6, 1987

[54] UNEQUAL COMPRESSOR REFRIGERATION CONTROL SYSTEM

[75] Inventors: Jake Persem, Tracy; Mike Quinn, Santa Clara, both of Calif.; Walter C. Emery, Newport, Oreg.; Philip E. Bracht, San Mateo, Calif.

[73] Assignee: Margaux Controls, Inc., San Jose, Calif.

[21] Appl. No.: 702,965

[22] Filed: Feb. 19, 1985

[51] Int. Cl.$^4$ .............................................. F25B 49/00
[52] U.S. Cl. ........................................ 62/126; 62/175; 62/228.3; 307/39; 364/153
[58] Field of Search .................... 236/1 EA; 62/228.3, 62/228.5, 175, 126; 307/39; 364/153

[56] References Cited

U.S. PATENT DOCUMENTS

| | | | |
|---|---|---|---|
| 4,210,957 | 7/1980 | Spethmann | 62/175 X |
| 4,384,462 | 5/1983 | Overman et al. | 62/175 |
| 4,463,574 | 8/1984 | Spethmann et al. | 62/175 |
| 4,483,152 | 11/1984 | Bitondo | 62/175 |

FOREIGN PATENT DOCUMENTS 1158745 12/1983 Canada .

*Primary Examiner*—William E. Wayner
*Attorney, Agent, or Firm*—Flehr, Hohbach, Test, Albritton & Herbert

[57] ABSTRACT

An apparatus and method for controlling a multi-compressor refrigeration system. The controller is designed to maintain a target temperature in a specified area. It achieves this goal by selecting compressor configurations which will maintain a target pressure on the common compressor suction line directing refrigerant into the compressors. As part of the process, the controller first establishes a record of the load handling capabilities of all useable configurations of the compressors. Then, periodically, it detects the current temperature and line pressure; selects a preferred configuration of compressors in accordance with a predetermined algorithmic function of the target pressure, the current line pressure, and the record of the load handling capabilities; and activates the preferred configuration if different from the currently active configuration. At at least one preselected time during the operation of an active compressor configuration the controller updates the record of load handling capabilities. This is done, in accordance with a predetermined algorithm, when the expected rate of change of the line pressure (determined by the record of load handling capabilities) does not match the actual rate of change while the active compressor configuration has been in use. The controller can also periodically float the target pressure by increasing the target pressure if the measured temperature is lower than the target temperature, and decreasing the target pressure if the measured temperature is higher than the target temperature.

25 Claims, 14 Drawing Figures

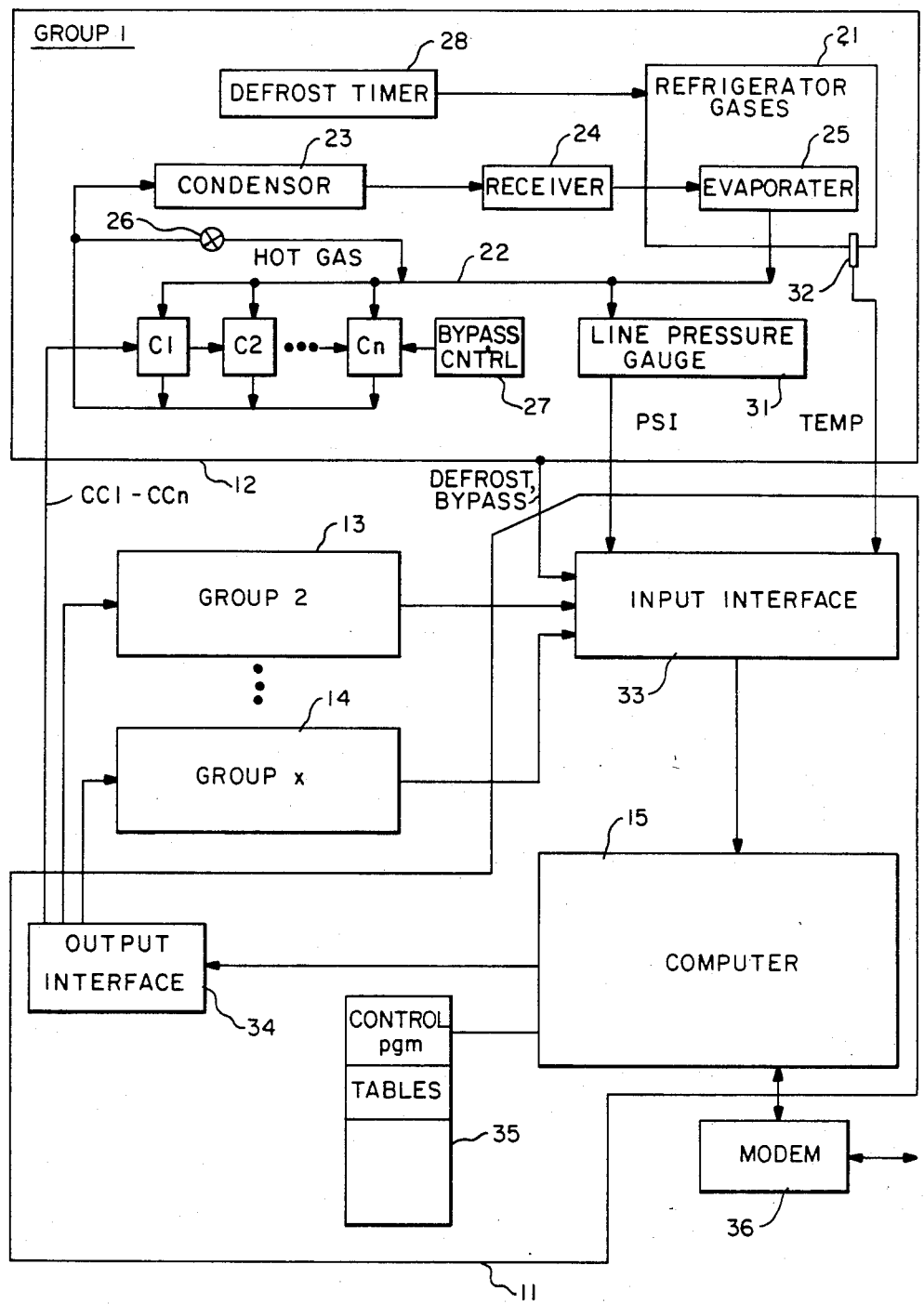
FIG.—1

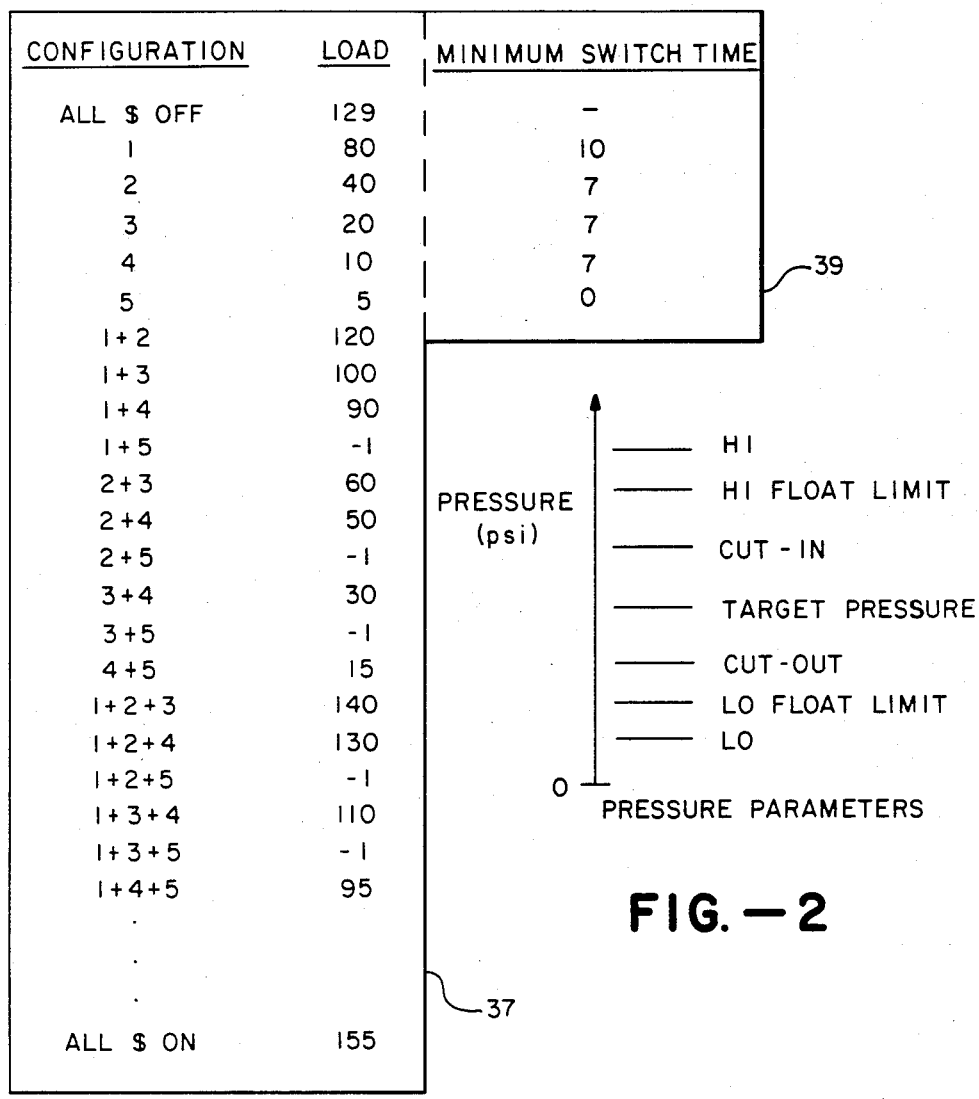
FIG.—2
FIG.—3

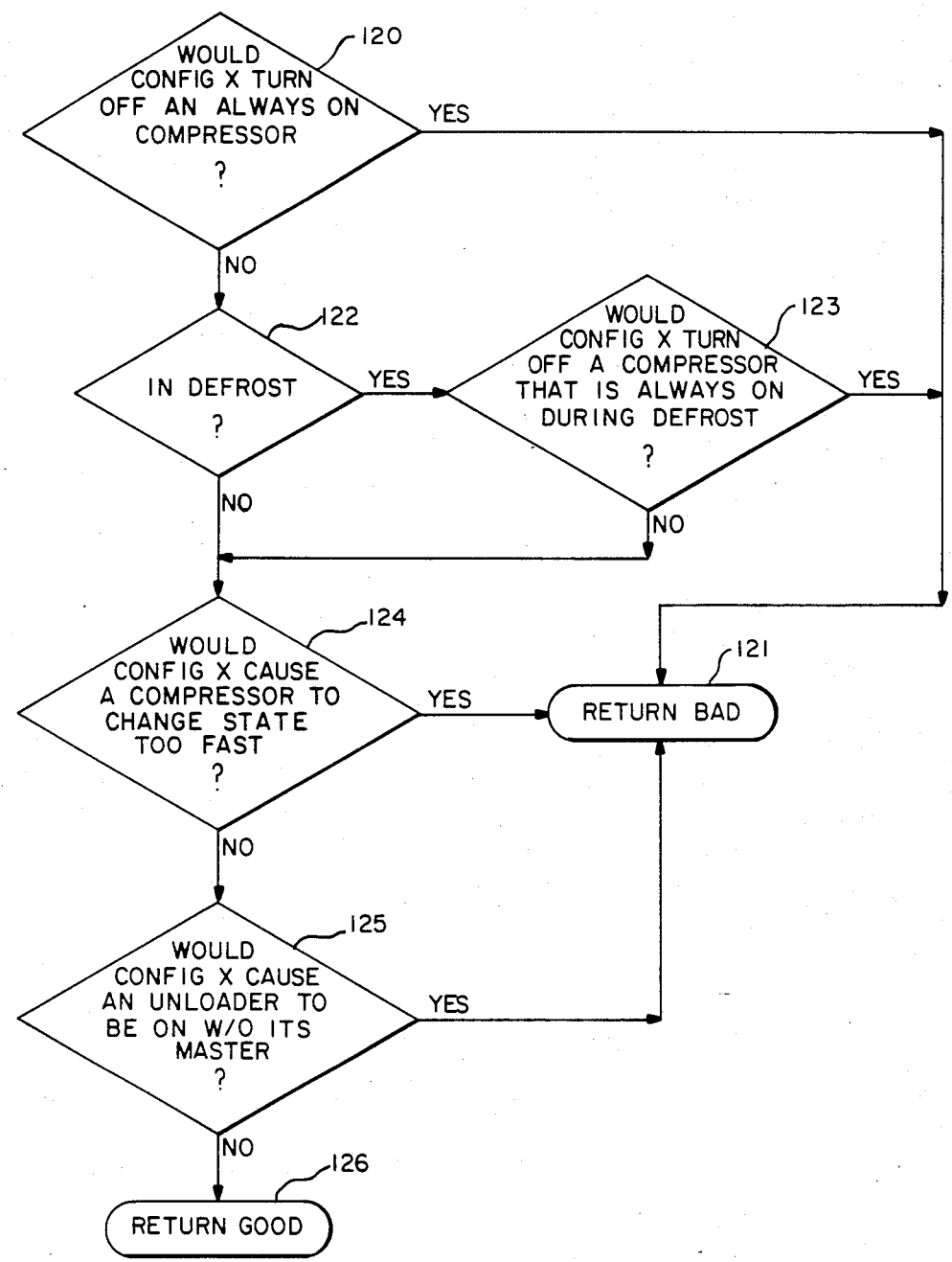
FIG.—9

FIGURE LOAD ROUTINE
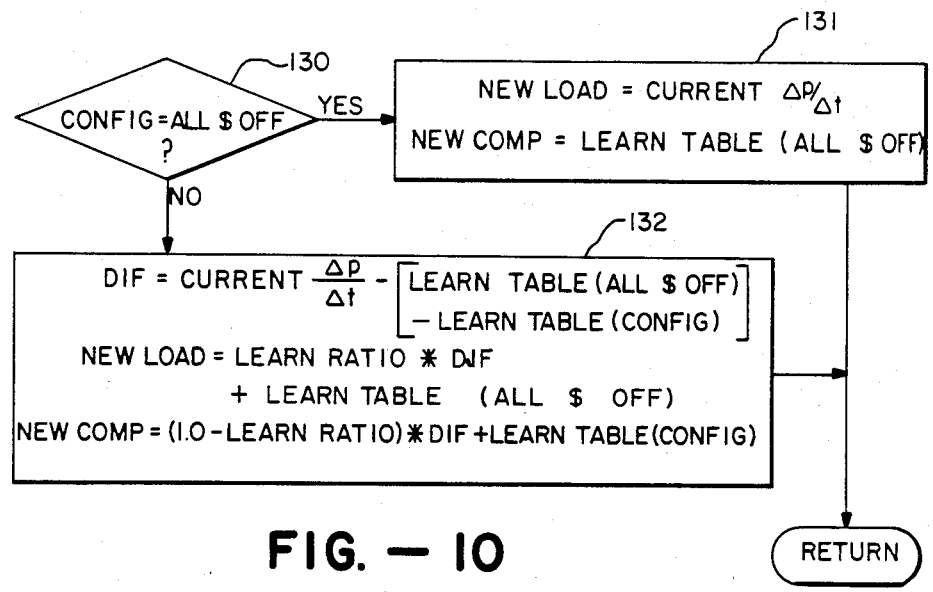
FIG. — 10
LEARN UPDATE ROUTINE
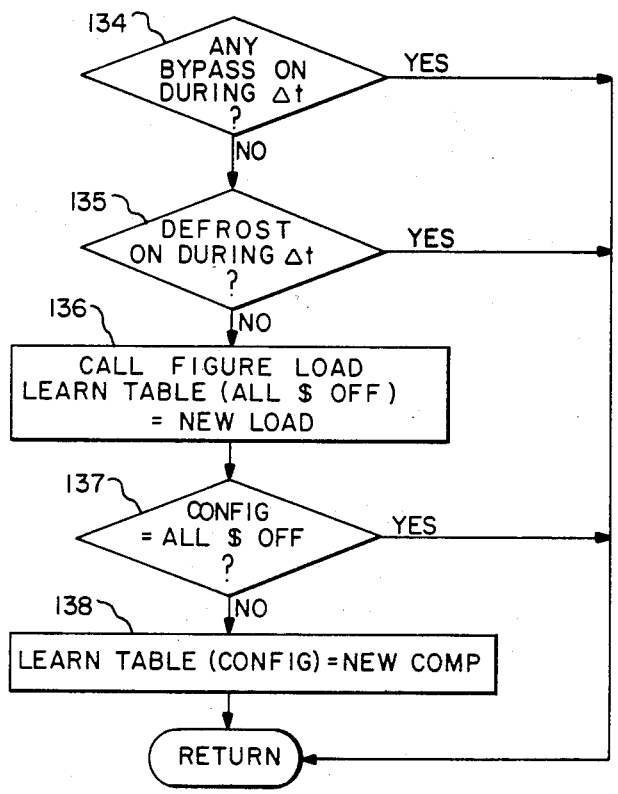
FIG. — 11

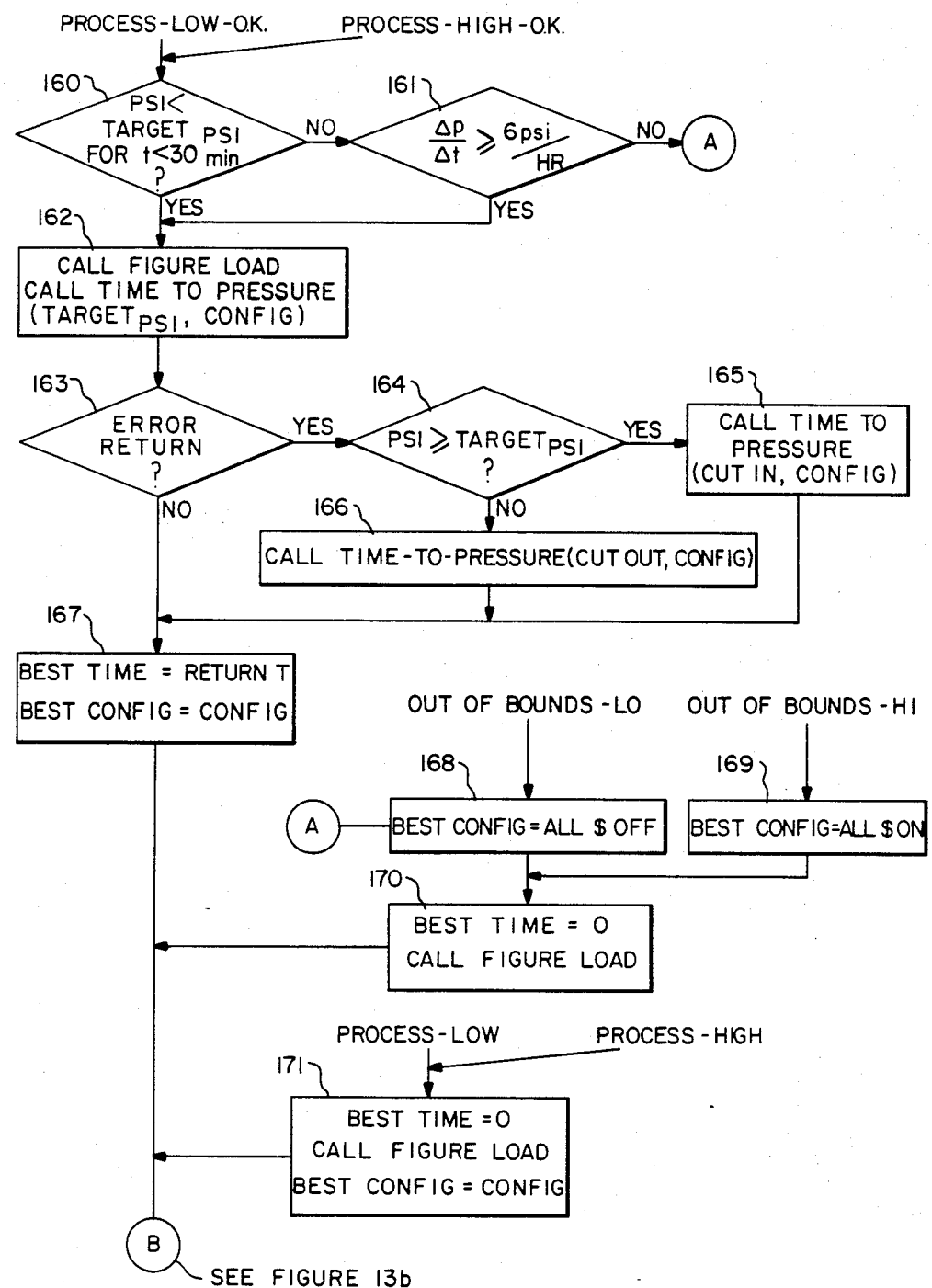
FIND NEW CONFIGURATION ROUTINE
FIG. —13a

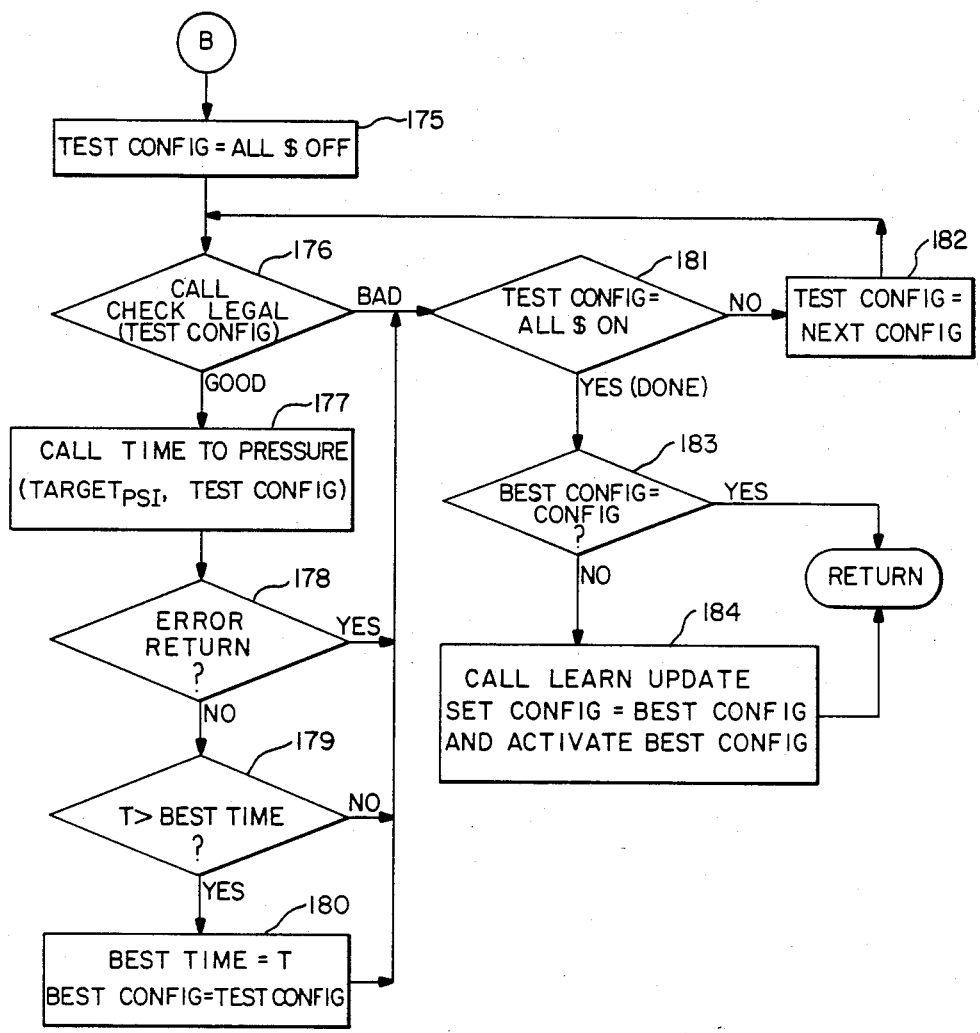
FIG.—13b

UNEQUAL COMPRESSOR REFRIGERATION CONTROL SYSTEM

The present invention relates generally to commercial refrigeration control systems, and particularly to control systems for refrigeration systems using several compressors which having varying capabilities.

The prior art includes relatively few multiple compressor refrigeration systems. These systems generally work as follows. The control system selects and turns on a set of compressors in response to a single physical measurement: the pressure in the compressor's suction line. The control system is supplied by the user with a target pressure value which corresponds to a target temperature in the refrigerator case. The control system then turns on extra compressors whenever the line pressure exceeds the target by a specified margin and turns off one or more compressors whenever the line pressure falls below the target pressure by a specified margin.

These prior art multiple compressor systems typically suffer most or all of the following deficiencies. First, few prior art systems known to the inventors are responsive to the actual temperature in the case. Practically all prior art systems assume that the target line pressure corresponds to a target temperature in the refrigerator cases regardless of the environmental conditions. This assumption is not justified. In fact, given a constant target line pressure the temperature in the refrigerator cases can vary more than enough to affect food quality. Therefore it is important to have a control system which will have as its primary goal the maintenance of a target temperature. Consequently, such a control system will have to vary the target line pressure to accommodate dynamic changes in the pressure-temperature relationship.

Second, most prior art multi-compressor systems use compressors with only a small range of load handling capabilities. This is not ideal because the goal of any control system should be to use the minimum amount of compressor power needed to achieve the target temperature. As will be clear to anyone who considers the matter, a binary weighted set of compressors is superior to a set of equal weight compressors because the binary weighted set will generally allow the selection of compressor configurations which more closely match the varying load on the refrigeration system. The inventors believe that most prior art systems have used equal weight or approximately equal weight compressors because of the difficulties in developing a control strategy for using a set of unequal weight compressors.

Third, none of the prior art systems take into account the well known phenomenon that the capacity of compressors changes over time. The most obvious manifestation of such a change is when the compressor breaks down, whereupon its load handling capacity drops to zero. Less dramatically, a compressor which is leaking freon or is in need of some other common types of maintenance often manifest its condition by a drop in the compressor's load handling capability. Ideally, a control system will take into account the compressor's decreased ability when deciding on the best compressor configuration to be used. Further, the control system should warn the user whenever a dramatic drop in a compressor's load handling ability occurs.

Fourth, few if any prior art systems take into account the fact that turning compressors on and off rapidly causes them serious harm.

Fifth, few if any prior art systems take into account the stratification of the air in the refrigerator cases during the nighttime when the air in the cases is not being disturbed by customers and stock clerks.

It is therefore a primary object of the present invention to provide an improved control system and method for controlling a multi-compressor refrigeration system.

Another object of the present invention is to provide a multi-compressor refrigeration control system which is responsive to the actual temperature in the refrigerator case and works to maintain a specified target temperature.

Another object of the present invention is to provide a multi-compressor refrigeration control system which uses unequal compressors and which attempts to minimize the energy used by the refrigeration system.

Another object of the present invention is to provide a multi-compressor refrigeration control system which is responsive to changes in the system's operating environment, including any changes in the capacity of the compressors in the system.

Yet another object of the present invention is to provide a multi-compressor refrigeration control system which prevents each compressor from being turned on and off more frequently than the compressor can handle.

Still another object of the present invention is to provide a multi-compressor refrigeration control system which allows the use of a higher target temperature for the refrigerator case at night than during the day.

In summary, the invention is an apparatus and method for controlling a multi-compressor refrigeration system. The controller is designed to maintain a target temperature in a specified area. It achieves this goal by selecting compressor configurations which will maintain a target pressure on the common compressor suction line directing refrigerant into the compressors. As part of the process, the controller first establishes a record of the load handling capabilities of all useable configurations of the compressors. Then, periodically, it detects the current temperature and line pressure; selects a preferred configuration of compressors in accordance with a predetermined algorithmic function of the target pressure, the current line pressure, and the record of the load handling capabilities; and activates the preferred configuration if different from the currently active configuration. At at least one preselected time during the operation of an active compressor configuration the controller updates the record of load handling capabilities. This is done, in accordance with a predetermined algorithm, when the expected rate of change of the line pressure (determined by the record of load handling capabilities) does not match the actual rate of change while the active compressor configuration has been in use.

The controller can also periodically float the target pressure by increasing the target pressure if the measured temperature is lower than the target temperature, and decreasing the target pressure if the measured temperature is higher than the target temperature. Additional features of the invention include the use of a nighttime target temperature, which is greater than the normal target temperature, and the provision for special actions to be taken when the system is in defrost.

Additional objects and features of the invention will be more readily apparent from the following detailed description and appended claims when taken in conjunction with the drawings, in which:

FIG. 1 depicts a block diagram of a multi-compressor refrigeration control system in accordance with the invention.

FIG. 2 depicts the set of line pressure parameters used in the preferred embodiment.

FIG. 3 depicts the Learn Table and Minimum Switch Table used in the preferred embodiment.

FIG. 9 is a flow chart of the CHECK LEGAL routine.

FIG. 10 is a flow chart of the FIGURE LOAD routine.

FIG. 11 is a flow chart of the LEARN UPDATE routine.

FIGS. 13a and 13b are a flow chart of the FIND NEW CONFIGURATION routine.

Figure 4:
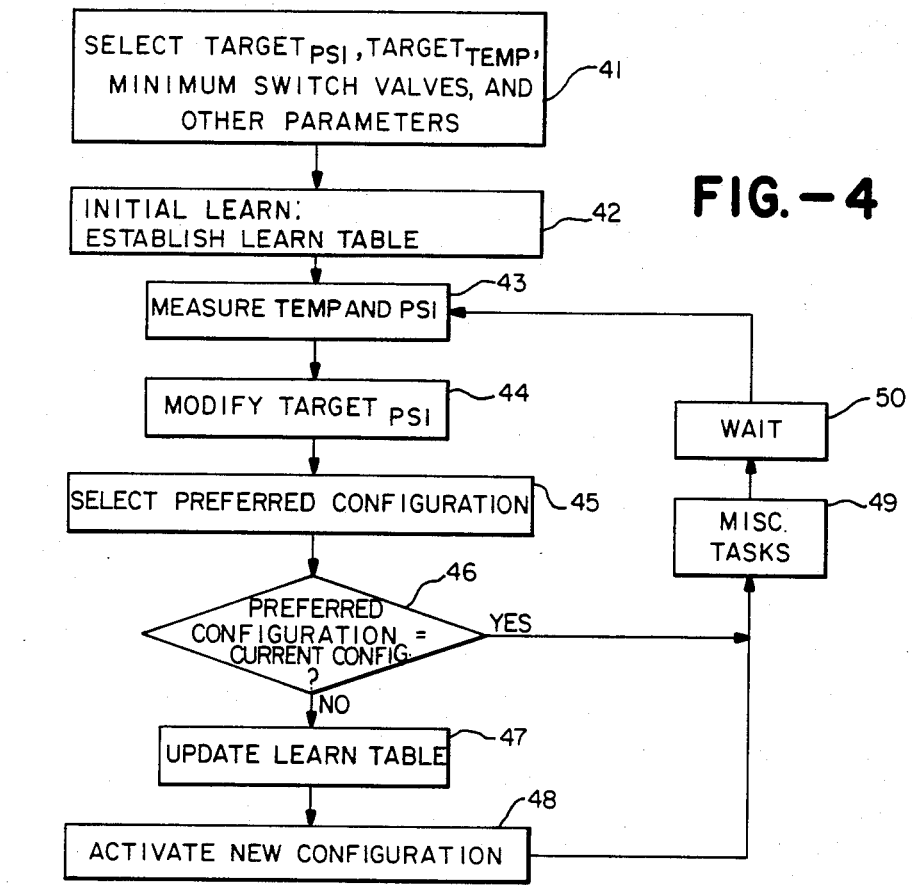
FIG. 4 is a general flow chart of the method of the invention.

Referring to FIG. 1, there is shown a refrigeration system including a control system 11 and several refrigeration groups 12, 13 and 14. Each refrigeration group 12 includes a set of refrigerator cases 21 for storing goods such as food, and a single common compressor suction line 22 for supplying refrigerant to a multiplicity of compressors C1 to Cn.

The refrigeration group 12 also includes all the standard elements of a standard commercial refrigeration system including a condenser 23, receiver 24, and evaporator 25. A defrost timer 28 periodically initiates the running of a defrost cycle. Systems using hot gas defrost will have a hot gas valve 26 for routing the hot refrigerant exiting the compressors back through the evaporator 25 in the opposite direction from the normal flow of refrigerant. The preferred embodiment has special logic for handling system control during hot gas defrost, but the provision of hot gas defrost is not required by the invention.

The refrigeration group 12 may also optionally have bypass apparatus 27 for forcing certain selected compressors on and overriding the operation of the controller 11. Bypass apparatus 27 is generally provided so that the refrigeration system 12 can be operated mechanically in the event that the control system 11 breaks down. The preferred embodiment also has a software bypass for forcing any selected set of compressors either on or off. This software bypass can be used for testing the operation of refrigeration system 12 and for turning off one or more selected compressors for maintenance work.

For the purpose of monitoring the operation of each refrigeration group 12 there is a line pressure gauge 31 for measuring the pressure on the compressor suction line 22 and at least one temperature sensor 32 for measuring the temperature in the refrigerator cases 21. The pressure parameter, PSI, is measured in pounds per square inch (psi) gauge (i.e., relative to atmospheric pressure). The temperature parameter, TEMP, is measured in degrees Celsius, but all temperature parameters which are specified by the user are specified in Fahrenheit units and the computer 15 converts these parameters into Celsius units for internal use. Other signals from the refrigerator group, all of which are optional, are DEFROST for indicating when the group is in defrost, and BYPASS for indicating if any of the compressors is being turned on by a bypass circuit.

The operation of the compressors in each refrigeration group 12 is controlled by a set of on/off signals cc1 to ccn corresponding to the compressors C1 to Cn in the refrigeration group 12.

The control system 11 is basically a computer 15 with input and output connections 33 and 34 to the refrigeration groups 12 to 14, special control software 35, and a modem 36. As in any such computer control system, the essence of the control strategy is embodied in the software 35. This control program 35 includes various data structures which are described below.

The computer 15 uses standard microcomputer architecture for sending and receiving data to and from the interfaces 33 and 34. The modem 36 is used for receiving control parameters, as described below, and for sending warning messages and other information to a remote computer system (not shown).

Figure 7:
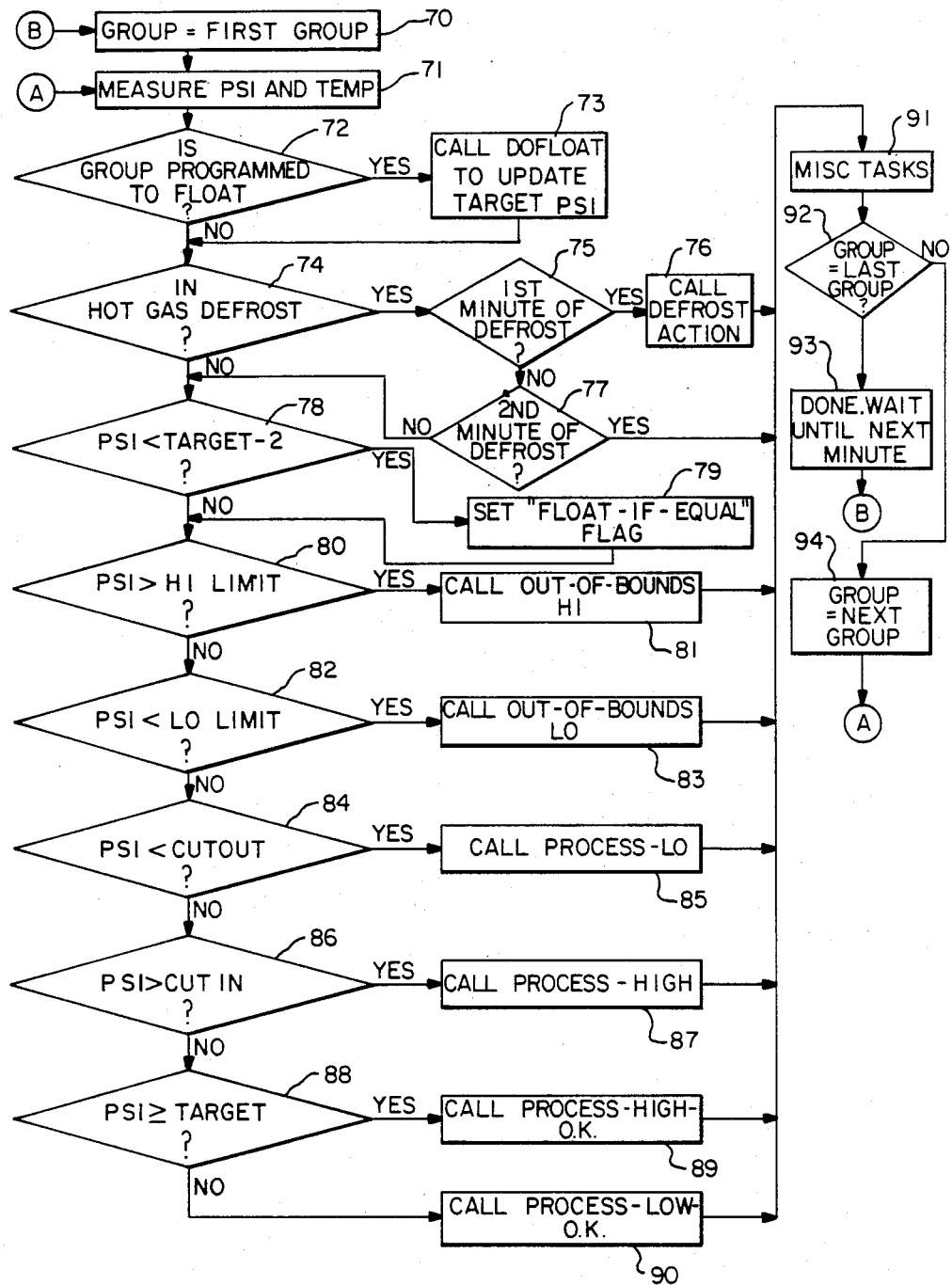
FIG. 7 is a flow chart of the main control routine used in the preferred embodiment.

In the preferred embodiment, up to eight refrigeration groups can be controlled by a single controller 11, but except where indicated below, the control system 11 will be described for the control of a single refrigeration group. As shown in FIG. 7, the control program 35 serially operates on each refrigeration group until is has processed all the groups.

For the purposes of this description the following terms are defined as follows. A "group" is a refrigeration group.

The terms "pressure" and "line pressure" refer to the line pressure in the compressor suction line 22.

The "load" on a group is the rate at which heat is being absorbed by the refrigerator cases and is measured in terms of the psi per minute at which the line pressure increases when no compressors are turned on. The "load handling capability" of a compressor is the amount of the load on the group which the compressor can counteract and is generally measured in terms of the number of psi per minute which the compressor can lower the line pressure in the absence of any load on the group.

A compressor "configuration" is a specification for all the compressors in a group indicating which are to be turned on and which are to be turned off. The term "configuration" is also sometimes used to refer to just the compressors which are on or which would be turned on if that configuration is selected by the controller 11.

Referring to FIG. 2 there is shown a chart of the pressure parameters used in the control program 35. These parameters are related to the physical pressure measurement PSI. The Target Pressure is initially set by the user of the system but can "float" under the control of the control program 35. For any given Target Pressure the user defines a set of progressively wider "guard bands". See the "delta" parameters in Table 1. The Cut-in and Cut-out parameters specify the highest and lowest line pressure which is desirable. As long as the line pressure is in this range the controller 11 need not change compressor configurations. These terms are derived from the need to "cut-in" additional compressor power if the line pressure rises too high and the need to "cut-out" some of the compressor power if the line pressure falls too low.

The HiFloat-Limit and LoFloat-Limit specify the highest and lowest line pressures which are tolerable. When the pressure is less than the Cut-out limit or greater than the Cut-in limit the controller 11 will try to select a conpressor configuration that will return the line pressure to the desirable range. If PSI exceeds Hi-Float-Limit or falls below LoFloat-Limit the controller 11 takes steps to force the selection of a compressor configuration which will return the line pressure to the desirable range.

Finally, the Hi and Lo limits are "alarm" limits. In the preferred embodiment, several sets of Hi and Lo alarm limits, each with a corresponding Delay time, can be specified. If the Hi or Lo limit of any alarm set is continuously violated for more than the corresponding Delay time then a warning message is sent by the computer 15 via the modem 36 to the user of the system. In practice this will rarely happen unless the compressors C1 to Cn in the system are incapable of handling the load on the refrigeration group 12.

Referring to FIG. 3, there is shown an example of a Learn Table 37 and a Minimum Switch Table 39 for the compressors in a group. In this example the group has five compressors labeled 1 to 5.

The primary use of the Learn Table 37 is to provide a knowledge base for the selection of the best compressor configuration for use in the current operating environment. The "best" configuration is generally that configuration which will best maintain the target temperature $TARGET_{TEMP}$ with the least use of energy. Furthermore, the preferred configuration must satisfy certain other conditions which are described in more detail below.

In the preferred embodiment, for every possible compressor configuration there is a table entry in the Learn Table 37.

The Learn Table 37 is an essential element in the preferred embodiment of the invention. It is used to respond to changes in the "operating environment" of the refrigeration group. The primary changes in the operating environment which are significant are changes in the load on the group and changes in the load handling capability of the compressors in the group.

The controller 11 is designed to accommodate changes in the load handling capabilities of the compressors regardless of their causes. Such changes in load handling capability are not attributable only to changes in the mechanical integrity of the compressors. It is an easily proven fact that the load handling capability of each available compressor configuration varies as a function of the current line pressure. Since the line pressure is almost always in a state of flux, because the current compressor configuration is rarely perfectly matched to the load and for other reasons explained below, the load handling capabilities of the compressors are also constantly changing.

Generaly, each time a new compressor configuration is selected and activated the Learn Table entry for the current configuration is updated to reflect the most recent measurements on the performance of the refrigeration group. This update procedure is not performed under certain specified conditions, as explained below with reference to FIG. 11.

In the Learn Table of FIG. 3, the exemplary load values are measured in units of psi/hr. The All$Off entry represents an estimate of the rate of change in the line pressure that would occur if no compressors were turned on. All the other entries represent an estimate of the load which the corresponding configuration can handle, which is equivalent to the rate at which the configuration could pump down the line pressure if there were no load on the group. In the table shown in FIG. 3 and in the actual preferred embodiment, all load values are measured in units of 0.5 psi/hr, and thus a value of "80" in the table represents a load handling capability of 40 psi/hr.

Furthermore it is preferred, but not essential to the invention, that the compressors be arranged in an order which facilitates the selection of the most energy efficient compressor configuration. Usually, if two compressor configurations have the same load handling capability, then the configuration using the least number of compressors will be the most energy efficient. In the method of the invention, the useable configurations are checked in the order that they are listed in the Learn Table. The configurations lower down in the table are selected only if they are "better" than the ones higher up in the table. Therefore the Learn Table 37 is organized with the compressor configurations using the largest and most efficient compressors at the top of the table, so that these will be selected if they are equal in load handling capacity with any other compressor configuration.

In the example shown in FIG. 3, no two configurations are equal in load handling capability. But in many systems the compressors are not binary weighted. Also the combined load handling capability of the configurations is usually less than the sum of the individual compressors in the configurations. These two factors contribute to there being a reasonable chance of two configurations having the same Learn Table entry value.

The Minimum Switch Table 39 of FIG. 3 contains a value for each individual compressor which represents the maximum rate at which that compressor should be turned on and off. The table values are supplied by the user of the system and are measured in units of minutes. For instance, a table entry of "7" means that if the corresponding compressor was turned on or off at time X then its on/off status cannot be changed by the controller 11 again until time=X+7 minutes.

The physical/experiential basis for the Minimum Switch Table is that rapid switching of the on/off status of compressors is extremely detrimental to their mechanical integrity. The maximum rate at which any particular compressor can be turned on and off varies considerably from model to model, but tends to fall in the range of 3 to 10 minutes.

One aspect of the invention is that the controller 11 prevents the selection and activation of any new compressor configuration which would force any compressor to switch on/off states twice in less than its corresponding minimum switch time, as specified in the Minimum Switch Table.

Another aspect of the Learn Table 37 and the Minimum Switch Table 39 as used in the preferred embodiment relates to the use of compressors with unloaders. First, as is known by anyone familiar with the use of such compressors, the unloader(s) for a compressor are not operative unless the compressor is on. Second, there is generally no need to restrict the rate at which unloaders are turned off and on. Third, even when fully unloaded such compressors still have one or more active cylinders.

These attributes of compressors with one or more unloaders are accounted for as follows. First, the unloaders for a compressor are always listed in the Learn Table and the Minimum Switch Table directly below the entry for the compressor (i.e., the entry for the compressor when it is fully unloaded). Thus each unloader is treated as separate compressor. Second, the Minimum Switch Time of the unloaders is set to zero as a method of indicating which "compressors" are really unloaders. Thus each item in the Minimum Switch Table with a zero entry is an unloader for the compressor with the closest entry above it which is not equal to zero. Third, configurations which include an unloader but not its compressor are "illegal" and cannot be used. Therefore the Learn Table entry for such configurations is set to a special value, such as −1, which indicates that these are not useable configurations. Furthermore, when a configuration with an unloader is selected it means that the unloader is not engaged and thus the corresponding cylinder of the compressor is active.

Naturally, in other embodiments, the use of unloaders could be accommodated in other ways. For instance, the identity of the unloaders could be noted in a data structure separate from the Minimum Switch Table. Also, the Learn Table could be constructed without any entries for configurations which are unusable.

The Learn Table 37 can be initially established in one of at least two ways. First, the user of the system could supply an initial estimate of the load handling capability of each compressor and then the control program 35 could just fill in the rest of the table by using the sum of the individual compressor capabilities as the entry for each of the multi-compressor configurations.

Second, and in the preferred embodiment, the Learn Table 37 is initially established through the use of the INITIAL LEARN routine shown in FIG. 6, which is discussed below.

Referring to FIG. 4, the is shown a flow chart of the main steps of the method. First (box 41) the user of the system selects certain basic parameters which are needed by the controller 11, including the values for the Minimum Switch Table 39, a Target$_{PSI}$, a Target$_{TEMP}$, and a set of pressure parameters corresponding to the chart shown in FIG. 2. A more complete listing of the parameters to be specified by the user are listed in Table 1. It should be noted that the Target$_{PSI}$ is just a function of the Target$_{TEMP}$ and the refrigerant being used in the refrigeration cycle, and can be looked up on a chart. Such charts are widely used in the refrigeration industry. While the user is asked to provide the Target$_{PSI}$ in the preferred embodiment, in other embodiments the controller 11 could derive this value given the Target$_{TEMP}$ and the refrigerant being used.

The second step of the method of the invention (box 42) is to establish a set of initial values for the Learn Table by means of the INITIAL LEARN process, which is described below with reference to FIG. 6.

The remaining steps of the method of the invention are repeated periodically (e.g., once each minute) for each refrigeration system being controlled.

At the beginning of each periodic cycle the temperature and pressure are measured (box 43). Then the Target$_{PSI}$ is modified (box 44) by a DOFLOAT routine, which is described below with reference to FIG. 8.

The next and most involved step of the method is selecting a preferred configuration (box 45) in accordance with a special predefined algorithmic function of the Target$_{PSI}$, current line pressure (PSI), and the values in the Learn Table 37. The preferred embodiment uses a function which selects as the preferred configuration that configuration which will take the longest to pump the line pressure up or down to the Target$_{PSI}$. Such a configuration selection scheme is preferred because it selects configurations which will closely match the load on the system and, if the load on the system does not change radically, will minimize the frequency with which new configurations must be activated.

If the preferred configuration is the same as the current preferred configuration (box 46) then the process continues on to some miscellaneous tasks (box 49). Otherwise the Learn Table is updated (box 47) and the selected configuration is activated (box 48). The miscellaneous tasks (box 49) include the sending of any warning messages, if necessary, and forcing the Learn Table to be updated if it hasn't been updated during the last hour. Finally, the control process is suspended (box 50) until it is time to restart the main control loop at box 43.

Figure 5:
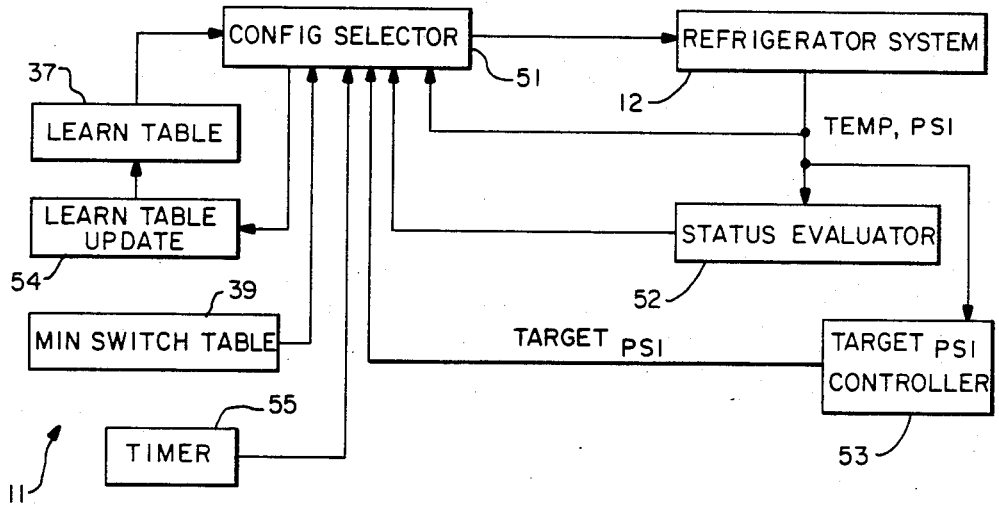
FIG. 5 depicts a block diagram of the major logical control elements of a multi-compressor refrigeration control system in accordance with the invention.

Referring to FIG. 5, the major logical control elements of a multi-compressor refrigeration control system 11 in accordance with the invention are as follows. The control system 11 is generally responsive to the current TEMP and PSI values, the Target$_{PSI}$, and the values in the Learn Table 37.

A configuration selector 51 periodically selects a preferred configuration of compressors for the refrigeration system 12 and activates the preferred configuration if it is different than the current configuration. The configuration selector 51 is supported by a status evaluator 52 which classifies the current status of the refrigeration system 12 into various categories which call for different control strategies. A Target$_{PSI}$ controller 53 floats the Target$_{PSI}$ value when appropriate. This helps select the most energy efficient configuration which is capable of maintaining the Target$_{TEMP}$ in the refrigeration system 12. A Learn Table updater (box 54) is used whenever a new configuration is selected, and a timer 55 is used to initiate the running of control process periodically. As can be seen, these logical control elements correspond to the major logical functions and data structures of the control program 35 which were described above.

Figure 6:
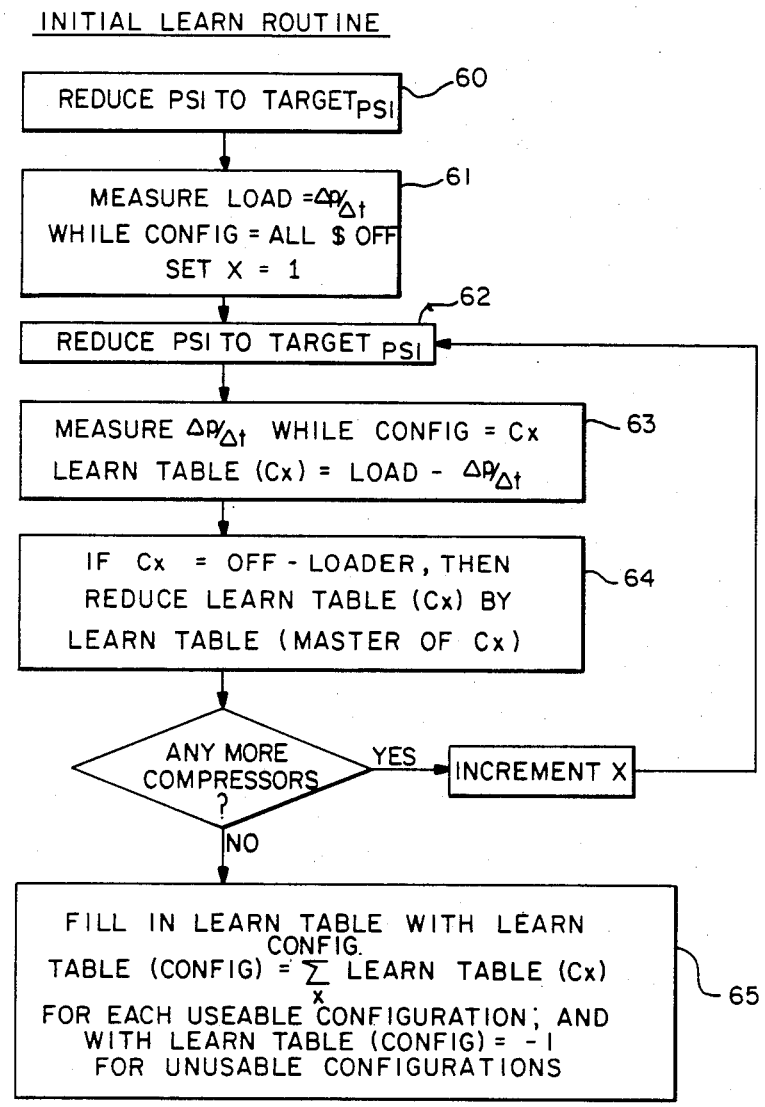
FIG. 6 is a flow chart of the INITIAL LEARN routine.

Referring to FIG. 6, the method of the INITIAL LEARN process is as follows. First the line pressure is pumped down to the target pressure by turning on all the compressors until PSI equals Target$_{PSI}$ (box 60). Then the load on the system is measured by turning all the compressors off for two minutes and measuring the rate of change of the line pressure (box 61). Then the load handling capability of each individual compressor is measured by pumping the line pressure down to the Target$_{PSI}$ (box 62) and then measuring the rate of change in the line pressure while just the individual compressor is turned on (box 63). The difference between the load and the measured rate is the load handling capability of the individual compressor. The load handling capability of the unloaders is determined by measuring the load handling capability of each unloader's compressor with the unloader disengaged (i.e., with the corresponding cylinder active), and then subtracting the load handling capability of the compressor when fully unloaded (box 64). The remainder of the Learn Table is filled in (see box 65) by using the sum of the individual compressor capabilities for the compressors in each multi-compressor configuration as the entry for each of the configurations. "Illegal" entries for configurations with unloaders but not the corresponding compressor are set to a special marker value.

Referring to FIG. 7, there is shown the main control routine of the preferred embodiment. This is the portion of the control program 35 which is used after the Learn Table has been established and all the initial operating parameters have been specified.

In the preferred embodiment, the primary initial operating parameters supplied by the user to the control program 35 are: the Target$_{TEMP}$, the Target$_{PSI}$, the pressure parameters shown in FIG. 2; the Minimum Switch Table; one or more sets of high and low pressure alarm limits, as described above; the set compressors which must be on during defrost, if any; the set compressors which must be on during the first minute of hot gas defrost, if any; and a flag specifying whether the Target$_{PSI}$ is allowed to float. See Table 1. Each of these parameters must be specified separately for each refrigerator group being controlled by the controller 11 and the control program 35.

Once each minute, the control program 35 performs a set of steps for each refrigeration group attached to the controller which evaluates the status of the group and decides whether to activate a new compressor configuration. Boxes 70, 92 and 94 of FIG. 7 provide the logical framework for controlling more than one refrigeration system with a single controller. The groups are processed serially, one after the other, and up to eight groups can be managed by the preferred embodiment. Clearly, the number of refrigerator groups that can be controlled by one controller is merely a function of the speed of the computer 15 being used and the amount of memory available for tables and parameter values.

For each group, the first step (box 71) of the periodic control process is to measure the line pressure (PSI) and the temperature (TEMP). In one embodiment, these values are measured numerous times each minute by an interrupt routine (not shown) and the average value for the last minute is used by the control program 35. Furthermore, more than one temperature sensor may be used, for instance if the group is being used to cool several refrigerator cases and a separate temperature sensor is placed in each case, and these values may also be averaged. This averaging technique helps smooth out any sudden transitions in these values and also helps mitigate the effect of any erroneous data received due to noise in the sensor lines and equipment.

If the group is programmed by the user to let the Target$_{PSI}$ float (box 72) then the DOFLOAT routine is run (box 73). The DOFLOAT routine, which is described in detail below in the discussion of FIG. 8, adjusts the Target$_{PSI}$ value in certain circumstances.

If the control program finds that the group is in hot gas defrost (box 74), and that this is the first minute of defrost (box 75), then a specified set of compressors is activated (box 76) and the rest of the control routine is skipped. Since it is possible that defrost was turned on by the defrost timer 28 (see FIG. 1) just seconds before the first defrost control routine cycle, during the second minute of defrost (box 77) the rest of the control routine is also skipped. This insures that the specified configuration for the first minute of hot gas defrost is in fact made active for at least one minute.

The best control strategy for the group depends on where the current PSI falls in the chart shown in FIG. 2. Boxes 78 to 90 evaluate the current status of the group in relation to the chart in FIG. 2.

For the most part, the control strategy is selected by selecting the proper entry point into the FIND NEW CONFIGURATION routine, which is described below with reference to FIGS. 13a and 13b.

Note that in the drawing, Target$_{PSI}$ is sometimes denoted simply as "Target".

Since it is not energy efficient for the group to run with the PSI below the Target$_{PSI}$, the program provides means (boxes 78 and 79) for enabling the floating of the Target$_{PSI}$ when the PSI falls 2 or more psi below target. When this happens, a "Float-if-Equal" flag is set which allows the Target$_{PSI}$ to float during the next control cycle even if the measured TEMP is equal to the Target$_{TEMP}$ (box 79).

If the measured PSI is above the HiLimit (box 80) or below the LoLimit (box 82), the controller 11 must take special action to try to bring the line pressure back into the acceptable range—which is between Cut-in and Cut-out—by using the Out-of-Bounds Hi (or Lo) entry points to the FIND NEW CONFIGURATION routine.

If the measured PSI is not "out of bounds" but is below Cut-out (box 84) or above Cut-in (86) then the line pressure is outside the acceptable range and the Process-Low (box 85) or Process-High (box 87) entry points to the FIND NEW CONFIGURATION routine are used, respectively.

If the measured PSI is within the Cut-in to Cut-out range, the the Process-High-OK entry point to the FIND NEW CONFIGURATION routine is used if PSI is equal to or greater than the Target$_{PSI}$ (box 89), and otherwise the Process-Low-OK entry point is used (box 90).

After the FIND NEW CONFIGURATION routine has been run, certain miscellaneous tasks are performed (box 91). These include running the LEARN UPDATE routine if it hasn't been run during the last hour. Also, warning messages can be sent to the user of the system if necessary.

Another important miscellaneous task involves the treatment of defrost. In the preferred embodiment, the Target$_{PSI}$ is temporarily incremented by delta-Cut-in during defrost. The delta-Cut-in parameter (see Table 1) is the temperature difference between the target pressure and the Cut-in pressure level, and is typically equal to 2 to 5 psi. This temporary increase in the target pressure is generated by increasing the Target$_{PSI}$ during the first minute of defrost and by decreasing the Target$_{PSI}$ during the cycle after the end of defrost. The purpose of this temporary increase in the target pressure is to force the system to select a smaller compressor configuration than normal, which helps the system keep the compressor suction line pressure stable. This procedure has been found to solve many of the problems caused by defrost in prior art systems.

After all the groups have been processed, the controller 11 idles (box 93) until a full minute has passed since the control routine last ran, and then the process resumes at box 70.

Figure 8:
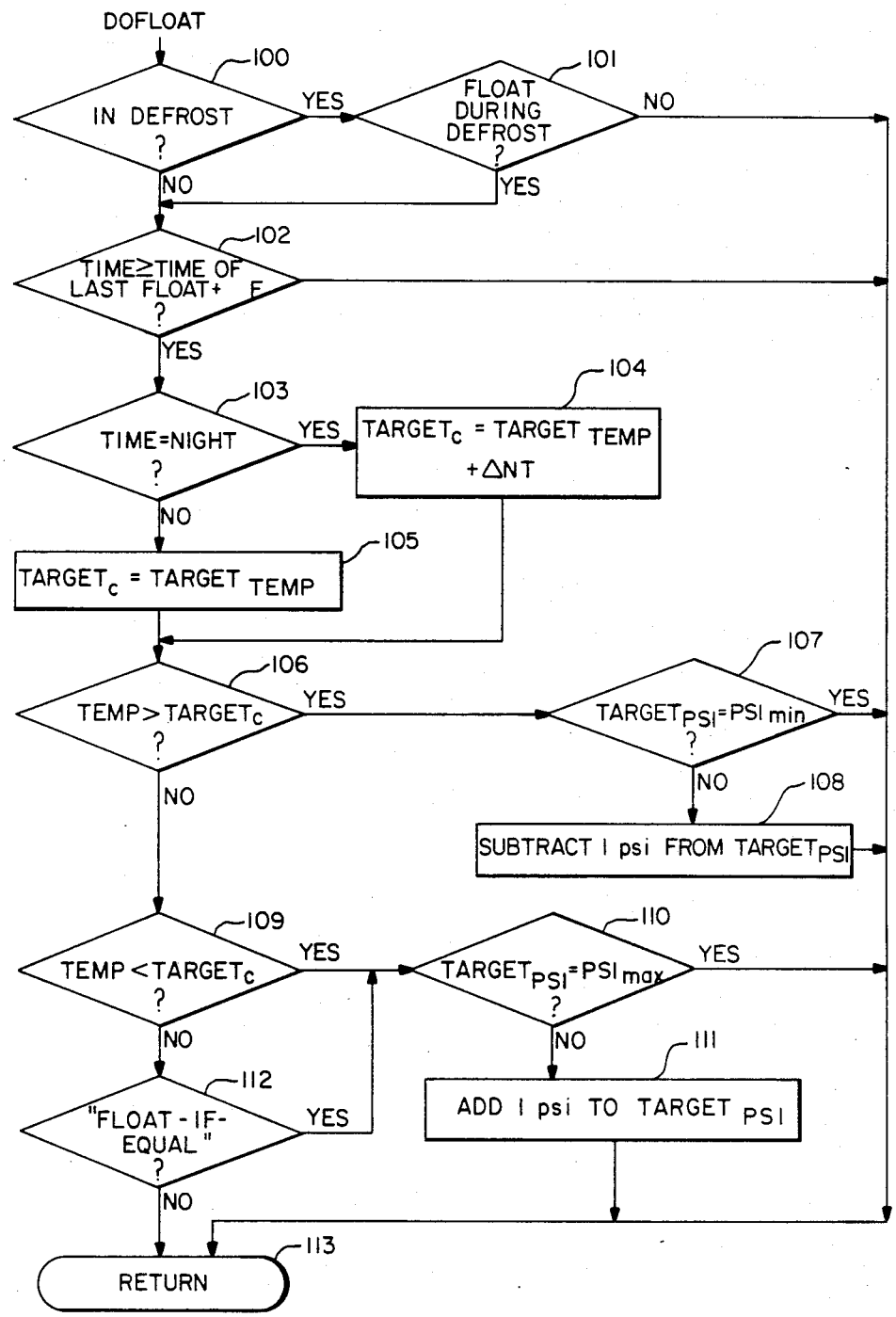
FIG. 8 is a flow chart of the DOFLOAT routine.

Referring to FIG. 8, the DOFLOAT routine modifies the Target$_{PSI}$ as follows. First, the Target$_{PSI}$ is modified if the group is in defrost (box 100) only if the user has specified that floating is to be performed during defrost (box 101). Normally floating will be disabled during defrost because otherwise the Target$_{PSI}$ tends to be lowered unnecessarily. However, floating during defrost will generally be enabled if the controller is being used to control a single compressor.

The DOFLOAT routine modifies the Target$_{PSI}$ only once every delta-TF minutes (box 102). The floating of the target pressure is intended to be a fairly slow process. Its purpose is to facilitate maintaining the target temperature, which is the primary mandate of the controller 11. Energy efficiency is the secondary mandate. In normal circumstances, frequently floating the target pressure would contribute to system instability. Therefore typical values of delta-TF range from 5 to 15 minutes (the allowed range of delta-TF values which the user can select from in the preferred embodiment is 0 to 299 minutes).

The DOFLOAT routine determines whether to float, and the direction to float, the target pressure depending on a comparison of the current temperature (TEMP) with a target temperature. For purposes of the DOFLOAT routine, the target temperature used (Target$_c$) is normally just the Target$_{TEMP}$ specified by the user (box 105). But at "night" (box 103), during a nighttime period defined by the user, the target temperature is increased (box 104) by delta-NT.

The use of a higher nighttime target temperature is premised partially on the observation that during the night, when the air in the refrigerator cases moves very little and becomes stratified, the temperature of the air next to the goods in the case is colder than the air around the temperature sensor 32. Also, sometimes the daytime target temperature is made artificially low to help counteract the flow of heat into the refrigerator cases caused by the frequent opening of the cases by customers and stock clerks. For these and other reasons it is often desirable to have different target temperatures during different portions of the day.

When the user specifies an initial Target$_{PSI}$, minimum and maximum target pressure float values PSI$_{min}$ and PSI$_{max}$ are also specified. These represent the most extreme line pressure values which the user considers to be reasonable and safe to use.

Given a target temperature Target$_c$, the Target$_{PSI}$ is decreased by one psi (box 108) if the measured TEMP is above the target temperature (box 106) and the Target$_{PSI}$ is not already at the minimum allowed target pressure PSI$_{min}$. The Target$_{PSI}$ is increased by one psi (box 111) if the measured TEMP is below the target temperature (box 109) and the Target$_{PSI}$ is not already at the maximum allowed target pressure PSI$_{max}$.

Furthermore, if the Float-if-Equal flag was set during the previous cycle (see box 79 of FIG. 7) (box 112) and the measured temperature is equal to the target temperature (box 109) then the Target$_{PSI}$ is increased by one psi (box 111) if the Target$_{PSI}$ is not already at the maximum allowed target pressure PSI$_{max}$ (box 110). The Float-if-Equal feature of the control program is designed to save energy by increasing the target pressure, which requires less compressor power to maintain, if the measured temperature is on target but the measured line pressure is substantially below target. As will be seen from the description below, increasing the target pressure can cause the system to select a more energy efficient compressor configuration.

FIGS. 9, 10, 11 and 12 contain the flow charts for four utility routines used by the FIND NEW CONFIGURATION routine of FIGS. 13a and 13b.

Referring to FIG. 9, the CHECK LEGAL (ConfigX) routine determines if a specified compressor configuration is available for use. If ConfigX is available for use, then the routine returns a value of GOOD (box 126); otherwise the routine returns a value of BAD (box 121).

Box 120 checks to see if ConfigX would turn off any compressor which is programmed to be always on. While not discussed above, in the preferred embodiment, in addition to a software bypass for forcing certain compressors on or off, the user can specify that certain compressors are to be always on. For instance, in a system in which the two largest compressors are of approximately equal load handling capability, but one is much more efficient than the other, the efficient one may be programmed to be always on if the load on the system is expected to always equal or exceed the load handling capability of that compressor.

If the group is in defrost (box 122) the routine checks (box 123) to see if ConfigX would turn off a compressor which is programmed to be always on during defrost.

In box 124 the routine consults the Minimum Switch Table to see if selecting ConfigX would cause any compressor to change on/off states faster than the maximum rate specified in the table.

Finally, the Learn Table is consulted in box 125 to see if ConfigX would cause an unloader to be used without its compressor.

Referring to FIG. 10, the FIGURE LOAD routine computes two values: NewLoad, which is an estimate of the current load on the group; and NewComp, which is an estimate of the current load handling capability of the configuration which is currently active. As explained above in reference to FIG. 3, the current best estimate of the load on the group is stored in the Learn Table in the All$Off entry.

As discussed above, the current rate of change in the line pressure (denoted delta-P/delta-T in FIG. 10) is equal to the difference between the load on the group and the load handling capability of the currently active compressor configuration. Note that "delta-P" is the change in line pressure during a period of time "delta-T", which is usually the period of time since the currently active compressor configuration was selected and activated. If the load and the configuration's capability are perfectly matched the line pressure will hold steady. Otherwise the direction and rate of change of the line pressure indicates whether the currently active configuration is too big or small and by how much.

The term "rate of change of the line pressure" is used herein to refer the vector quantity which specifies both the direction and magnitude of the rate of change. The term "load" is synonymous with "the rate of change of the line pressure when no compressors are on".

Furthermore, the expected rate of change of the line pressure is equal to the difference between the Learn Table entries for All$Off and for the currently active configuration.

If no compressors are on (Config=All$Off) (box 130) then the FIGURE LOAD routine just computes and stores the current load in the NewLoad variable, and saves the previous estimate of the load in the NewComp variable (box 131).

The difference between the actual rate of change and the expected rate of change of the line pressure is calculated by the FIGURE LOAD routine and held in a variable called Dif:

Dif = current value of
(delta-P/delta-T) − (LearnTable(All$Off) − LearnTable(Config)).

This difference is effectively an error. An aspect of the invention is that a portion of this error is allocated, in accordance with a predetermined algorithm, to the record in the Learn Table of the load handling capability of the currently active configuration.

If any compressors are on, this difference Dif is allocated between the load and the current compressor configuration in accordance with these formulas:

NewLoad=LearnRatio*Dif+Learn_Table(All$-Off)

NewComp=(1−LearnRatio)*Dif+Learn_Table(-Config).

In effect, LearnRatio specifies what portion of the error is allocated to the estimate of the load and what portion is allocated to the estimate of the load handling capability of the currently active configuration. In the preferred embodiment, LearnRatio can be assigned a value between 0.80 and 0.95. Experience by the inventors indicates that LearnRatio values close to 0.95 work best.

The idea behind this allocation of the difference between the actual and expected rate of change of the line pressure is that most of this difference will be due to changes in the load on the group. Changes in the load occur when someone opens a refrigerator case door and allows warm air to enter, when sunlight hits the refrigerator case, when the ambient temperature in the surrounding air changes, and so on. However, some of this difference is often due an error in the estimate of the load handling capability of the compressor configuration. This may be because one or more of the compressors in the configuration has a mechanical problem, or because the load handling capability is different at different line pressures, or for any one of a variety of other reasons, known or unknown.

By allocating a small portion of this Dif value to the compressor configuration, the Learn Table entry for the configuration will be slowly adjusted to reflect reality. If the Learn Table entry is already accurate, and the Dif value is really due only to a change in the load on the group, the minor adjustments in the Learn Table entry will balance out over time and the Learn Table entries will remain virtually constant. By choosing a LearnRatio value close to 1.0, the Learn Table is adjusted sufficiently slowly that no single update of the table causes a significant change in the behavior of the system. Only accumulated adjustments to entries in the Learn Table are significant.

The computed "actual" rate of change of the line pressure, in the preferred embodiment is actually averaged over the period since the present configuration was first activated. That is, delta-P is the difference between the current line pressure and its value when the current configuration was first activated; and delta-T is the length of time since the current line configuration was activated.

If a configuration is active for over an hour, one of the miscellaneous tasks (see box 91 of FIG. 7) of the controller calls the LEARN UPDATE routine and then resets the initial pressure value for purposes of the FIGURE LOAD routine to the then current line pressure.

Furthermore, in one preferred embodiment, the initial line pressure used in the FIGURE LOAD routine to compute the delta-P value is actually the pressure value measured 15 to 45 seconds after the current configuration was first activated. The purpose of this delay is to obtain a more accurate representation of the average rate of change in the line pressure. Often, in medium and high temperature refrigeration systems, the line pressure drops or rises sharply when a new compressor configuration is activated. This sudden change in line pressure is basically unrelated to the rate of change of the line pressure thereafter. The inventors have found that it is best to factor out this sudden pressure change from the calculation of the current rate of line pressure. The delay period is specified by the user and is selected to encompass this period of sudden change.

Referring to FIG. 11, the LEARN UPDATE routine updates the Learn Table if the system has not had any bypasses on during the delta-T period (box 134) and has not been in defrost during the delta-T period (box 135). This routine calls the FIGURE LOAD routine and then puts the new estimate of the load into the All$Off entry of the Learn Table (box 136). Then, if any compressors were on (box 137) the new estimate of the configuration's load handling capability is put in the Learn Table entry for the configuration (box 138).

Only the Learn Table entry for the current configuration is updated by the LEARN UPDATE routine in the preferred embodiment. In an alternate embodiment the (1.0−LearnRatio)*Dif value is allocated, pro rata, to all the compressors in the configuration, and then all the entries in the Learn Table for configurations using those compressors are updated accordingly. Such an update routine helps quickly detect mechanical problems which decrease the load handling capability of any compressor.

In the preferred embodiment, the presence of a compressor with mechanical difficulties can be detected either by comparing "normal" and current Learn Table values; or by detecting if certain configurations are rarely or never selected. As will be seen from the discussion of the FIND NEW COMPRESSOR routine, if a compressor configuration includes a very weak compressor it will be chosen less and less often.

Figure 12:
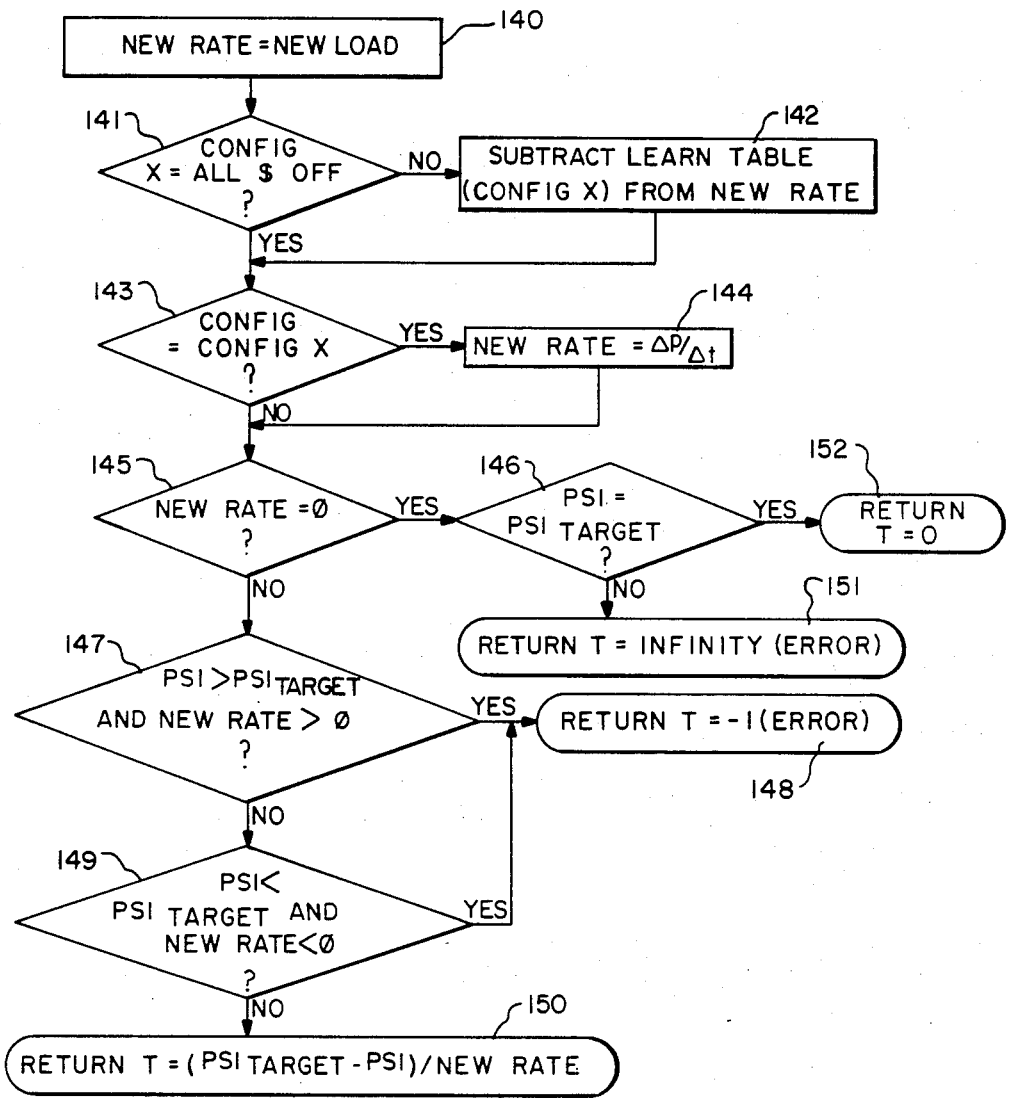
FIG. 12 is a flow chart of the TIME-TO-PRESSURE routine.

Referring to FIG. 12, the TIME TO PRESSURE ($PSI_{target}$, ConfigX) routine computes how long, given the current load on the system, it would take ConfigX to bring the line pressure to a value of $PSI_{target}$. If ConfigX could never bring the line pressure to $PSI_{target}$ then an error value is returned. This routine is used by the FIND NEW CONFIGURATION routine to test all the usable configurations.

The TIME TO PRESSURE routine first computes the predicted rate of change of line pressure if ConfigX is not the current configuration (boxes 140 to 142) and the actual rate of change if ConfigX is the current configuration (boxes 143 and 144).

If ConfigX is the All$Off configuration (box 141), then the expected rate of change (NewRate) is the estimated load (NewLoad) from the FIGURE LOAD routine. Otherwise the expected rate of change is the estimated load (NewLoad) minus the Learn Table entry for ConfigX (box 142).

If NewRate is zero (box 145), then the line pressure is not changing. If the current PSI equals the $PSI_{target}$, then it will take no time for the pressure to reach the target and the routine returns with a value of T−0 (box 152). Otherwise the routine returns with a value of T infinity (box 151), indicating that the pressure will never reach the target with ConfigX.

If NewRate is not zero but the use of ConfigX would cause the line pressure to move further away from the target than the current PSI (boxes 147 and 149) then the routine returns with a value of T−1 to indicate an error condition. Otherwise (box 150) the routine returns with a value of $$T - (PSI_{target} - PSI)/NewRate,$$

which is the expected length of time it will take ConfigX to bring the line pressure to the specified target pressure.

Referring to FIGS. 13a and 13b, the FIND NEW CONFIGURATION routine has several entry points, as described above with reference to FIG. 7. The goal of the routine is to find a preferred compressor configuration. It uses the Learn Table as a knowledge base in order to determine which configuration will take the longest to reach the target pressure. The preferred configuration is either the configuration which will take the longest to reach the target pressure, or the current configuration if it will keep the line pressure within the range between Cut-out and Cut-in for an even longer period of time.

The most complicated part of the FIND NEW CONFIGURATION concerns the routine used when the current PSI is in the acceptable range between Cut-out and Cut-in. The first steps (boxes 160 and 161) test to see if, although the load and present configuration appear to be well matched, the controller 11 should search for a more efficient configuration. In particular, if the system appears to have plateaued (i.e., to have maintained a close match between its load and the selected configuration) the controller adopts a strategy which should force the controller to select a new configuration if the system is working properly. The rationale behind this strategy is that plateauing is impossible in the real world—real world conditions are virtually never sufficiently static for the refrigeration system to efficiently use a single configuration for hours. Furthermore, maintaining a configuration which keeps the compressor line pressure below target is energy inefficient.

In the preferred embodiment, plateauing is sensed by testing to see if the line pressure has been below the target value for over 30 minutes and if the current rate of change of the line pressure is less than 6 psi/hour. If so, the controller jumps over to the Out-of-Bounds Lo entry point, which is described below. This will ordinarily force the system to select a more energy efficient compressor configuration which will allow the compressor line pressure to slowly rise above the target pressure level. If this strategy fails and the system plateaus for a specified period of time (e.g., 40 minutes), one of the miscellaneous tasks in the main routine (box 91 in FIG. 7) is to send out an alarm. Such an alarm condition could indicate, for instance, that the system's sensor lines or compressor control lines are not properly connected.

More typically, when the system has not plateaued, the control routine calls FIGURE LOAD and then the TIME TO PRESSURE routine for the current configuration (box 162), which yields a figure for how long the current configuration will take to reach the target. If the pressure is not heading toward the target, then it computes the time it will take to reach either Cut-in or Cut-out (boxes 164, 165 and 166). In either case, the computed time value is stored in the BestTime variable, and the BestConfig variable is set equal to the current configuration. Then the routine continues at point B on FIG. 13b.

At the Out-of-Bounds entry points the BestConfig variable is set to either All$Off (box 168) or All$On (box 169) depending on which direction the current line pressure is out of bounds. Also, BestTime is set to zero and FIGURE LOAD is called (box 170). By setting BestTime to zero, the routine is indicating that any other configuration which will pull the line pressure towards the target will be preferred over the All$On or All$Off configuration.

Selecting the All$On or All$Off configuration may violate the maximum on/off compressor switch rates specified in the Minimum Switch Table. In the preferred embodiment, this is the one exception to the use of the Minimum Switch Table criteria. It is justified by the extreme system condition of the line pressure being completely out of bounds. This condition vary rarely occurs, unless the available compressors are unable to handle the load on the system or some of the initial parameters specified by the user (see Table 1) were erroneous. However, in another embodiment, instead of forcing a value of All$On or All$Off, the largest or smallest "usable" configuration could be selected as the default configuration for use in boxes 168 and 169, thereby avoiding any possible conflict with the Minimum Switch Table.

At the Process-Low and Process-High entry points (box 171) the current configuration is saved in the BestConfig variable, but is given the lowest possible weight by assigning it a BestTime value of zero. Also FIGURE LOAD is called.

Referring to FIG. 13b, the FIND NEW CONFIGURATION routine proceeds by testing all the useable configurations to find the one with the longest time-to-pressure value.

The configurations are tested in the order they appear in the Learn Table, starting with All$Off (box 175). First the TestConfig is tested (box 176) to see if it is "legal" by calling the CHECK LEGAL routine, described above with reference to FIG. 9. If TestConfig is useable (GOOD), the next step is calculating the time it would take TestConfig to bring the line pressure to Target$_{PSI}$ by calling the TIME TO PRESSURE routine (box 177). If the routine returns a non-error value (box 178) that is longer than the BestTime found so far (box 179), then TestConfig becomes the new BestConfig and its time-to-pressure value is stored in BestTime (box 180).

After the current TestConfig has been processed, the routine checks to see if TestConfig is the last available configuration to be tested (box 181). If not, the next configuration in the Learn Table is processed (box 182).

After all the configurations have been tested, the routine checks to see if BestConfig is the current configuration (box 183). If so, the routine just exits. Otherwise the Learn Table is updated by the LEARN UPDATE routine and the BestConfig configuration is activated (box 184).

As noted above, in some embodiments of the invention, when a new configuration is first activated, the line pressure is remeasured after a specified period of time and then this remeasured value and the time it was measured are used as the new starting point for calculating the actual rate of change of the line pressure.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

In particular, the invention is applicable to other multi-compressor temperature control systems which use multiple compressors on a single refrigerant cycle. Thus the invention could be used in air conditioning systems and in heat pump heating systems. In such contexts, the measured and target temperature would be temperature of the space which is being cooled or heated.

TABLE 1

PARAMETERS SPECIFIED BY USER

| PARAMETER | DESCRIPTION |
|---|---|
| AlarmSet | sets of high and low pressure limits and corresponding lengths of time which indicate an alarm condition |
| Always-On | compressors which must always be on |
| Defrost-Always-On | compressors which must be on during defrost |
| delta-Cut-in | difference between target and Cut-in pressure |
| delta-Cut-out | difference between target and Cut-out pressure |
| delta-Hi | difference between the target pressure and Hi alarm pressure level |
| delta-HiLimit | difference between the target pressure and HiLimit pressure level |
| delta-Lo | difference between the target pressure and Lo alarm pressure level |
| delta-LoLimit | difference between target and LoLimit pressure level |
| delta-NT | nighttime increase in target temperature |
| delta-TF | time between changes in target pressure |
| Float-Defrost | specifies if target pressure is allowed to float during defrost |
| Hot-Gas-On | compressors which must be on during first minute of hot gas defrost |
| LearnRatio | portion of difference between expected and actual rate of change of line pressure which is allocated to the estimate of the load |
| MINIMUM SWITCH | table: minimum time between changes in on/off states for each compressor |
| night | defines nighttime period |
| $PSI_{min}$ | lowest pressure to which the target pressure can float |
| $PSI_{max}$ | highest pressure to which the target pressure can float |
| $Target_{PSI}$ | initial target pressure |
| $Target_{TEMP}$ | target temperature |

What is claimed is:

1. In a method of controlling a refrigeration system having at least one refrigerator case wherein goods are stored, a refrigeration system for said cases including a plurality of compressors having a common compressor suction line directing refrigerant into the compressors, means for detecting the pressure in the compressor suction line, the initial steps of:
   selecting a target pressure for said compressor suction line; and
   establishing a record of the load handling capabilities of a multiplicity of configurations of said compressors; and
   the steps of periodically:
      detecting the current line pressure;
      selecting a preferred configuration of compressors in accordance with a predetermined algorithmic function of the target pressure, the current line pressure, and said record of the load handling capabilities; and
      activating said preferred configuration of compressors if different from the currently active configuration; and
      at at least one preselected time during the operation of an active compressor configuration:
         determining the expected rate of change of the line pressure while said active compressor configuration is in use, said determination being in accordance with said record of the load handling capabilities;
         determining the actual rate of change of the line pressure while said active compressor configuration has been in use; and
         updating said record of the load handling capabilities, in accordance with a predetermined algorithm, when said actual rate of change of the line pressure is not equal to said expected rate.

2. In the method of claim 1,
   wherein said refrigeration system includes means for measuring the temperature in at least one of said refrigerator cases;
   the steps of:
      selecting a target temperature; and
      periodically floating the target pressure, said floating step including the steps of:
         increasing the target pressure if the measured temperature is lower than the target temperature; and
         decreasing the target pressure if the measured temperature is higher than the target temperature.

3. In the method of claim 2, said floating step further including the step of:
   increasing the target pressure if said measured temperature is equal to the target temperature.

4. In the method of claim 2, the additional step of specifying a nighttime target temperature, which is greater than said selected target temperature;
   said floating step further including the step of:
      using said specified nighttime target temperature as the target temperature in said increasing and decreasing steps, if the time of day is during a specified nighttime period.

5. In the method of claim 2, the refrigeration system further having means for indicating when it is in defrost, said floating step further including the step of suspending said increasing and decreasing steps while said refrigeration system is in defrost.

6. In the method of claim 1, said updating step including the step of
   allocating a specified portion of the difference between said actual rate of change and said expected rate of change to said record of the load handling capabilities for said active compressor configuration.

7. In the method of claim 6, said record of the load handling capabilities of said compressors including a record of the load handling capabilities of each individual compressor and a record of the load handling capabilities of each useable combination of said compressors; said allocating step including the step of allocating a portion of detected rate of change of the line pressure to both the record for said active compressor configuration and the record of the load handling capabilities for each of the individual compressors in said active compressor configuration.

8. In the method of claim 1, said detecting step including the step of detecting the rate of change of the line pressure.

9. In the method of claim 1, said step of selecting a preferred configuration of compressors including the step of selecting the configuration of said compressors which will, in accordance with said record of the load handling capabilities, most slowly bring said line pressure to said target pressure.

10. In the method of claim 1, said initial steps further including the step of defining for each said compressor a minimum switch time; and said step of periodically selecting a preferred configuration of compressors including the step of limiting the configurations of said compressors which are available to the currently selected configuration and those configurations which will not force any compressor to switch on/off states twice in less than said minimum switch time for said compressor.

11. In the method of claim 10, said initial steps further including the step of defining one or more sets of warning parameters, each set of warning parameters including a low pressure value, a high pressure value, and a delay period value;

said periodic steps further including the step of periodically comparing the line pressure with each of the low and high pressure values in said warning parameter sets, and generating a warning message if the line pressure has been lower than the low pressure value or higher than the high pressure value of any of warning parameters sets for longer than the corresponding delay period value.

12. In the method of claim 1, the refrigeration system further having means for indicating when it is in defrost;

said initial steps further including the step of specifying a set of compressors which must always be on during defrost;

said step of periodically selecting a set of compressors including, if said refrigeration system is in defrost, the step of selecting and turning on said specified set of compressors which must be on during defrost.

13. In the method of claim 12, the refrigeration system further having means for indicating when it is in hot gas defrost;

said initial steps further including the step of specifying a set of compressors which must used during a predefined initial period of hot gas defrost;

said step of periodically selecting a set of compressors including, if said refrigeration system is in hot gas defrost, the step of activating said specified set of compressors which must be used during hot gas defrost.

14. In the method of claim 11, wherein said plurality of compressors includes a set of at least three compressors having logarithmically distributed load handling capabilities.

15. In a method of controlling a refrigeration system for removing heat from a preselected area, the refrigeration system including a plurality of compressors having a common compressor suction line directing refrigerant into the compressors, and means for detecting the pressure in the compressor suction line, the steps of:

selecting a target pressure for said compressor suction line;

establishing and at selected times periodically updating a record of the load handling capabilities of a multiplicity of configurations of said compressors; and periodically selecting a preferred configuration of compressors in accordance with a predetermined algorithmic function of the target pressure, the current line pressure, and said record of the load handling capabilities; and activating said preferred configuration of compressors if different from the currently active configuration;

thereby responding dynamically to changes in the operating environment of said refrigeration system.

16. In the method of claim 15, wherein said refrigeration system includes means for measuring the temperature in at least one portion of said preselected area;

the steps of:

selecting a target temperature; and periodically floating the target pressure, said floating step including the steps of:

increasing the target pressure if the measured temperature in said preselected area is lower than the target temperature; and decreasing the target pressure if the measured temperature in said preselected area is higher than the target temperature.

17. In the method of claim 16, said updating step including the step of allocating a specified portion of the difference between the detected rate of change of the line pressure and said expected rate to said record of the load handling capabilities for said active compressor configuration.

18. In the method of claim 17, the further step of defining for each said compressor a minimum switch time;

said step of periodically selecting a preferred configuration of compressors including the step of limiting the configurations of said compressors which are available to the currently selected configuration and those configurations which, if activated, would not force any compressor to switch on/off states twice in less than said minimum switch time for said compressor.

19. In a control system for a refrigeration system for removing heat from a preselected area, the refrigeration system including a plurality of compressors having a common compressor suction line directing refrigerant into the compressors, and means for detecting the pressure in the compressor suction line, software means comprising:

means for selecting a target pressure for said compressor suction line;

means for establishing and at selected times periodically updating a record of the load handling capabilities of a multiplicity of configurations of said compressors; and means for periodically selecting a preferred configuration of compressors in accordance with a predetermined algorithmic function of the target pressure, the current line pressure, and said record of the load handling capabilities; and activating said preferred configuration of compressors if different from the currently active configuration;

said software means thereby providing means for responding dynamically to changes in the operating environment of said refrigeration system.

20. In the software means of claim 19, wherein said refrigeration system includes means for measuring the temperature in at least one portion of said preselected area;

means for selecting a target temperature; and means for periodically floating the target pressure, including:
- means for increasing the target pressure if said measured temperature is lower than the target temperature; and
- means for decreasing the target pressure if said measured temperature is higher than the target temperature.

21. In the software means of claim 20, wherein said updating means includes means for disabling the updating of said record or load handling capabilities when said refrigeration system is in a defrost cycle; and means for disabling said target pressure floating means when said refrigeration system is in a defrost cycle.

22. In the software means of claim 20, said updating means including means for allocating a specified portion of the difference between the detected rate of change of the line pressure and the expected rate, based on said record of load handling capabilities, to said record of the load handling capabilities for said active compressor configuration.

23. In the software means of claim 22, means for defining a minimum switch time for each said compressor;

means for periodically selecting a preferred configuration of compressors including
- means for limiting the configurations of said compressors which are available to the currently selected configuration and those configurations which, if activated, would not force any compressor to switch on/off states twice in less than said minimum switch time for said compressor.

24. In a method of controlling a refrigeration system for removing heat from a preselected area, the refrigeration system including a plurality of compressors having a common compressor suction line directing refrigerant into the compressors, means for measuring the temperature in at least one portion of said preselected area, and means for detecting the pressure in the compressor suction line, the steps of:

selecting a target pressure for said compressor suction line;

selecting a target temperature; and periodically floating the target pressure, said floating step including the steps of:
- increasing the target pressure if the measured temperature in said preselected area is lower than the target temperature; and
- decreasing the target pressure if the measured temperature in said preselected area is higher than the target temperature.

25. In the method of claim 24, the additional steps of:

increasing the target pressure during defrost cycles of said refrigeration system; and disabling said periodically floating step during defrost cycles of said refrigeration system.

* * * * *